United States Patent
Ohuchi et al.

(10) Patent No.: US 8,800,964 B2
(45) Date of Patent: Aug. 12, 2014

(54) FEMALE SCREW MEMBER, MOTOR OPERATED VALVE USING THE SAME, AND METHOD FOR PRODUCING FEMALE SCREW MEMBER FOR MOTOR OPERATED VALVE

(75) Inventors: Tomoari Ohuchi, Tokyo (JP); Takeshi Suganuma, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 280 days.

(21) Appl. No.: 13/167,758

(22) Filed: Jun. 24, 2011

(65) Prior Publication Data
US 2011/0315906 A1    Dec. 29, 2011

(30) Foreign Application Priority Data

Jun. 25, 2010 (JP) .................................. 2010-144578

(51) Int. Cl.
*F16K 51/00* (2006.01)
(52) U.S. Cl.
USPC ....... 251/288; 251/129.12; 251/265; 251/273
(58) Field of Classification Search
USPC ............... 251/129.11, 129.12, 264, 265, 273, 251/286, 288
See application file for complete search history.

(56) References Cited

U.S. PATENT DOCUMENTS

| | | | |
|---|---|---|---|
| 5,851,003 A * | 12/1998 | Aoki et al. | 251/288 |
| 7,165,755 B2 * | 1/2007 | Umezawa et al. | 251/129.11 |
| 7,205,690 B2 * | 4/2007 | Hatano et al. | 310/80 |
| 7,494,108 B2 * | 2/2009 | Inoue et al. | 251/129.11 |
| 7,703,743 B2 * | 4/2010 | Muramatsu | 251/129.11 |
| 2010/0181514 A1 * | 7/2010 | Ohuchi | 251/264 |
| 2010/0263433 A1 * | 10/2010 | Michel | 73/1.72 |
| 2011/0023513 A1 * | 2/2011 | Hamel et al. | 62/211 |

* cited by examiner

*Primary Examiner* — John K Fristoe, Jr.
*Assistant Examiner* — Ian Paquette
(74) *Attorney, Agent, or Firm* — Bacon & Thomas, PLLC

(57) ABSTRACT

A female screw member includes a female screw part with a female screw, and a projection part projecting in the direction of a center shaft of the female screw and having a working face in the rotating direction centering on the center shaft. The female screw part and projection part are integrally molded with a resin. The projection part has a spiral inclination face spirally inclining by one round from the working face centering on the center shaft of the female screw. The height H of the working face is equal to or smaller than a pitch P of the female screw. Using the projection part as a fully opening fixing stopper, a motor operated valve includes a valve main body having a valve seat, the female screw member attached to the valve main body, a motor having a rotator and stator, and a valve shaft. The valve shaft is screwed to a female screw of the female screw member, and is rotated and driven by the rotor, and has a fully opening movable stopper capable of contacting the fully opening fixing stopper.

15 Claims, 11 Drawing Sheets

FEMALE SCREW MEMBER, MOTOR OPERATED VALVE USING THE SAME, AND METHOD FOR PRODUCING FEMALE SCREW MEMBER FOR MOTOR OPERATED VALVE

BACKGROUND OF THE INVENTION a) Field of the Invention

The present invention relates to a female screw member, a motor operated valve using the female screw member, and a method for producing the female screw member for the motor operated valve.

b) Description of the Conventional Art

As a motor operated valve used for controlling the flow rate of a refrigerant or the like in a refrigerating cycle system, Japanese unexamined patent publication No. 2006-70990 discloses the motor operated valve having a driving mechanism configured to contact/separate a valve body with/from a valve seat by utilizing rotation of a rotor of an electric motor. In such motor operated valve, when the valve is in fully closing, an upper stopper body fixed on a valve shaft holder collides with a lower stopper body fixed at a guide bush to stop rotation and downward movement of the valve shaft. The motor operated valve adopts such a screw removing structure that in a fully opening direction, the valve shaft holder is finally unscrewed from the guide bush fixed at the valve main body to stop upward movement of the valve shaft.

However, the screw removing structure in the fully opening direction like the above described motor operated valve cannot be adopted for a motor operated valve having a configuration that the valve shaft holder cannot be unscrewed from the guide bush.

On the other hand, Japanese examined patent publication No. H6-94910 discloses an electric control valve provided with a valve part including a valve seat and a valve body, a stepping motor part, which is positioned in the upper direction of the valve part and contacts/separates the valve body with/from the valve seat by a rotation of a rotor. This electric control valve includes a fully opening stopper for restricting the movement of valve body to a fully opening position of the valve, and a fully closing stopper for restricting the movement of valve body to a fully closed position of the valve, and these stoppers are provided in the upper direction of the rotor in a closed casing.

However, in the above-described electric control valve, since the fully opening and closing stoppers are positioned in the upper direction of the rotor, the entire length of the electric control valve comes to be long. In addition, since the number of parts used for the fully opening and closing stoppers increases, there is a problem that the operability for the assembly of the valve is degraded so that a manufacturing cost increases. Further, if such the fully opening and closing stoppers are to be provided in the rotor, it is necessary to decrease an outer diameter of the shaft valve holder in order to provide an installation space. Accordingly, it comes to be difficult to secure installation or setting space for a coil spring for urging the valve body. Therefore, it has been difficult to downsize the motor operated valve while maintaining a large valve aperture.

Thus, the applicant of the present application has proposed a motor operated valve with reduced number of parts, having an easily assembled structure, and capable of maintaining a large valve aperture even if downsizing, in Japanese patent application No. 2009-11549, which was published on Aug. 5, 2010, as Japanese unexamined patent publication No. 2010-169173.

As illustrated in FIGS. 7A to 7E, the motor operated valve according to such prior proposed invention is provided with a valve main body 55 including two conduits 52 and 53 and a valve seat 54, a can 56 connected with the valve main body 55, and a rotor 57 arranged inside the can 56 and forming a part of an electric motor. The motor operated vale is further provided with a stator (not illustrated) fixed at an outer peripheral part of the can 56 and rotating/driving the rotor 57, a male screw member (valve shaft) 60 connected integrally to the rotor 57 via a supporting ring 59, and a female screw member (valve shaft holder) 61 whose lower end part is fixed at the valve main body 55 via a joint ring 65, where the male screw member 60 is inserted into the female screw member 61. The motor operated valve is further provided with a valve body 62 being locked at a lower end part of the male screw member 60 and contacting to/separating from a valve seat. In addition, FIG. 7A illustrates a cross-sectional view when fully closing, and FIG. 7B illustrates a cross-sectional view when fully opening. Furthermore, FIGS. 7C to 7E and FIGS. 8A to 8C illustrate the female screw member 61 integrally molded with the joint ring 65.

With the aforementioned configuration, when an operator desires to close the motor operated valve 51, an electric current is made to flow in the stator in one direction so as to magnetically excite the stator, in a state illustrated in FIG. 7B, so that the rotor 57 rotates in a clockwise direction as viewed from an upper side. Simultaneously, the male screw member 60 rotates and goes down while threadedly connecting a male screw 60a to a female screw 61a, and the valve body 62 sits down on the valve seat 54. Then, the motor operated valve 51 is closed.

At a time when the valve body 62 sits down on the valve seat 54, a fully closing upper stopper part 59a does not reach to a fully closing lower stopper part 61d, and the rotor 57 is in a further rotatable state. The rotor 57 further rotates in a clockwise direction as viewed from an upper side, and when the fully closing upper stopper part (fully closing movable stopper for restricting the movement of valve body to a fully closing position of the valve) 59a is in contact with the fully closing lower stopper part (fully closing fixing stopper for restricting the movement of valve body to a fully closing position of the valve) 61d, the rotation of the rotor 57 is forcibly stopped.

Further, when the valve body 62 sits down on the valve seat 54, the male screw member 60 further goes down although the valve body 62 stops moving. Thus, the coil spring 64 is compressed to press the valve body 62 toward the valve seat 54, and an operation ends with a state illustrated in FIG. 7A.

On the other hand, when an operator desires to open the motor operated valve 51, an electric current is made to follow in the stator in an opposite direction to the above mentioned direction so as to magnetically excite, in a state illustrated in FIG. 7A, so that the rotor 57 rotates in the counterclockwise direction as viewed from upper direction. Then, the male screw member 60 also rotates and goes up while screwing the male screw 60a to the female screw 61a, and the valve body 62 is separated from the valve seat 54, so that the motor operated valve is opened. Further, the rotor 57 further rotates, and when the fully opening lower stopper part (fully opening movable stopper for restricting the movement of valve body to a fully opening position of the valve) 67 is in contact with the fully opening upper stopper part (fully opening fixing stopper for restricting the movement of valve body to a fully opening position of the valve) 61f, the rotation of rotor 57 stops, and the up going of valve body 62 also stops.

As mentioned above, according to the motor operated valve 51 of the prior proposed invention by the applicant, the female screw member 61 is integrally molded with the two stopper parts 61d and 61f functioning at times of the fully opening and the fully closing of the motor operated valve 51. Thus, the downsizing of the motor operated valve 51 comes to be possible, and the number of parts decreases. In addition, since the female screw member 61 is integrally molded with the two stopper parts 61d and 61f, the positional relationship between the two stopper parts 61d and 61f can be stabilized, so that assembling can be improved.

However, in the motor operated valve 51 according to the prior proposed invention by the applicant, as illustrated in FIG. 9, when the joint ring 65 is insert-molded so as to produce the female screw member 61 and the joint ring 65 by using one core 70, the stopper part 61f comes to be an undercut, so that the core 70 comes to be non-rotatable. In other words, although FIG. 9 illustrates a state that the female screw member 61 is molded by using the core 70, if the core 70 is rotated to be taken out downward after the female screw member 61 is molded, the core 70 cannot be rotated since the stopper part 61f exists, so that the core 70 cannot be taken out downward.

Therefore, as illustrated in FIGS. 10A to 10B, two cores 73 and 74 (a core 73 to form a female screw 61a, and a core 74 to form a cylindrical part with a large diameter which is formed continuously to the female screw member 6a) are used in addition to an upper mold 71 and a lower mold 72. After the core 73 is fixed to the core 74, these cores 73 and 74 are arranged inside the upper mold 71 and the lower mold 72. After a joint ring 65 is insert-molded, the core 74 and the core 73 are taken out in this order, more specifically, after or while the core 74 is removed, the core 73 is rotated to be taken out. Accordingly, an inner wall face of the female screw member 61a can be molded while avoiding the undercut of the stopper part 61f. However, in such a production method, it is difficult to completely align cores between the cores 73 and 74. Thus, misalignment may occur between the female screw 61a of the female screw member 61 and the lower end part 61c. Therefore, there is a problem that integrating the female screw member 61 with the male screw member 60 is difficult (refer to FIGS. 7A to 7E).

Further, a space may be formed between the cores 73 and 74. When the space is formed, a burr is generated at the space portion, and an operation to remove the burr is necessary. So, there is a problem that the production cost of the motor operated valve 51 increases. Although the core 74 can be integrated with the lower mold 72, there is a similar problem to the aforementioned problem in such a case.

SUMMARY OF THE INVENTION

Therefore, the present invention has been proposed to solve the aforementioned problems of the prior proposed invention by the applicant, and an objective of the present invention is to provide an improved female screw member, which includes a female screw part including a female screw formed therein, and a projection projecting in the direction of a center shaft of the female screw part and having a working face in a rotating direction centering on the center shaft. When the above female screw member is integrally molded with a resin, the above female screw part and the projection part can be molded by using only one core. The present invention is also directed to a motor operated valve using the female screw member, and a method for producing the female screw member for the motor operated valve.

According to a first aspect of the present invention to realize the aforementioned objectives, a female screw member includes a female screw part formed with a female screw, and a projection part projecting in the direction of a center shaft of the female screw part and having a working face in the rotating direction centering on the center shaft, wherein the female screw part and projection part are integrally molded with a resin. In the female screw member, the projection part has a spiral inclination face which spirally inclines by one round from the working face centering on the center shaft of the female screw. The height of the working face is equal to or smaller than a pitch of the female screw.

According to a second aspect of the present invention, a female screw member includes a female screw part formed with a female screw, and a projection part projecting in the direction of a center shaft of the female screw and having a working face in the rotating direction centering on the center shaft, wherein the female part and projection part are integrally molded with a resin. In the female screw member, the projection part has a spiral inclination face which spirally inclines from the working face centering on the center shaft of the female screw. The spiral inclination face is formed so that the female screw member is not interfered with the spiral inclination face when rotating in line with a thread of the female screw.

In the female screw member according to the present invention, it is preferable that the spiral inclination face includes at least one plane part vertical to the center shaft while rotating by one round from the working face and reaching again to the working face.

Further, according to the present invention, it is preferable that the spiral inclination face includes a linear part in development elevation at least a part thereof.

Further, according to the present invention, it is preferable that the female screw part includes a cylindrical part having a larger inner diameter than the female screw, and the projection part is formed at a bottom of the cylindrical part.

According to the present invention, since an inner wall part of the female screw member can be molded with one core, core misalignment does not occur between the female screw of the female screw member and a lower end part of the female screw. Furthermore, the occurrence of a burr can be prevented.

In the female screw member according to the present invention, it is preferable that the projection part is a fully opening fixing stopper in contact with a fully opening movable stopper provided at a valve shaft of a motor operated valve which is threadedly connected to the female screw.

Further, according to the present invention, it is preferable that a fully closing fixing stopper is further formed at an end part on the opposite side to the cylindrical part in the female screw part.

The female screw member having the aforementioned configuration can be used for a motor operated valve.

According to a third aspect of the present invention, a motor operated valve includes a valve main body having a valve seat, the above-mentioned female screw member attached to the valve main body, an electric motor having a rotor and a stator, and a valve shaft. The valve shaft is threadedly connected to a female screw of the female screw member, and rotated and driven by the rotor, and has a fully opening movable stopper capable of contacting to the fully opening fixing stopper.

According to a fourth aspect of the present invention, a motor operated valve includes a valve main body having a valve seat, the above-mentioned female screw member attached to the valve main body, an electric motor having a rotor and a stator, and a valve shaft. The valve shaft is threadedly connected to a female screw of the female screw member, and is rotated and driven by the rotor. The valve shaft has a fully opening movable stopper capable of contacting to the fully opening fixing stopper, and has a fully closing movable stopper capable of contacting to the fully closing fixing stopper.

According to the motor operated valve of the present invention, since a female screw member can be molded by one core, core misalignment does not occur between a female screw part of the female screw member of the motor operated valve and a lower end part of the female screw member, and the occurrence of a burr can be prevented. Thus, the manufacturing cost of the motor operated valve can be reduced.

According to a fifth aspect of the present invention, a method for producing a female screw member adapted to be used in a motor operated valve is provided. The motor operated valve includes a male screw member and a valve body. The male screw member rotates according to the rotation of a rotor of an electric motor and is threadedly connected to the female screw member fixed at a valve main body. The valve body contacts to/separates from a valve seat in the valve main body by rotating the male screw member. The female screw member includes a female screw part to be threadedly connected to a male screw part of the male screw member. The female screw member further includes a concave part which is provided more on the valve main body side than the female screw part, and has a cylindrical space having a larger diameter than a screw diameter of the female screw part. The female screw member yet further includes a fully opening stopper part in the concave part. The fully opening stopper part projects toward the valve main body, and is in contact with a stopper part rotating according to the rotation of a rotor of the electric motor when fully opening the motor operated valve, and regulates the rotation in the valve opening direction of the male screw member. When the female screw member is molded, a lower mold, an upper mold, and one core are used. The lower mold is provided to mold a valve main body side of the female screw member. The upper mold is provided to mold a female screw part side of the female screw member. The core is provided to simultaneously mold the female screw part and the concave part having the cylindrical space. The core is configured to be demoldable without interfering the fully opening stopper part.

Further, according to the present invention, since the female screw member can be molded with one core, core misalignment does not occur between a female screw part of the female screw member of the motor operated valve and a lower end part of the female screw member, and the occurrence of a burr can be prevented. Thus, the manufacturing cost of the motor operated valve can be reduced.

In the method for producing the female screw member adapted to be used in the motor operated valve, the fully opening stopper part includes a contact face in contact with a stopper part rotating according to the rotation of a rotor of the electric motor. The fully opening stopper part further includes a spiral inclination face which gradually approaches the female screw part side from a projecting edge part of the contact face. The fully opening stopper part yet further includes a circumferential inner face positioned on the axial line side of the female screw part. The core can mold the contact face, the spiral inclination face, and the circumferential inner face.

Furthermore, in the method for producing the female screw member adapted to be used in the motor operated valve, the female screw member has a disc-like joint ring on an outer surface of the concave part, and the disc-like joint ring is provided for fixing the female screw member at the valve main body. The female screw member can be insert-molded, holding the joint ring with the lower mold and the upper mold.

As mentioned above, the present invention can provide an improved female screw member capable of preventing the occurrence of core misalignment between a female screw of a female screw member and a lower end part of a female screw member, preventing the occurrence of a burr, and reducing the manufacturing cost of the motor operated valve. Furthermore, the present invention can provide a motor operated valve using the improved female screw member, and a method for producing the improved female screw member.

BRIEF DESCRIPTION OF DRAWINGS

FIGS. 1A to 1C illustrate an example of a female screw member according to the present invention, wherein FIG. 1A is a top plan view, FIG. 1B is a cross-sectional view taken along the line A-A in FIG. 1A, and FIG. 1C is a bottom view.

FIGS. 2A to 2B illustrate the female screw member shown in FIGS. 1A to 1C, wherein FIG. 2A is a perspective illustration viewed from above, and FIG. 2B is a perspective illustration viewed from beneath.

FIGS. 3A to 3B illustrate the female screw member shown in FIGS. 1A to 1C, wherein FIG. 3A is a sectional perspective illustration viewed from beneath, and FIG. 3B is a partly sectional perspective illustration viewed from beneath.

FIGS. 4A to 4B illustrate an example of metal molds used in a production of a female screw member according to the present invention, wherein FIG. 4A is a sectional front view, and FIG. 4B is a cut-away perspective view.

FIGS. 6A to 6C are explanatory diagrams illustrating a modified example of a spiral inclination face 1e, describing a situation that the spiral inclination face 1e is pulled out (a core 13 is pulled out) by using development elevations developing the spiral inclination face 1e centering on a center shaft of a female screw 1a.

FIG. 7C is a top plan view of the female screw member, FIG. 7D is a cross-sectional view taken along the line B-B in FIG. 7C, and FIG. 7E is a bottom view.

FIGS. 8A to 8C illustrate the female screw member shown in FIGS. 7C to 7E, wherein FIG. 8A is a perspective illustration viewed from above, FIG. 8B is a cut-away perspective illustration viewed from beneath, and FIG. 8C is a perspective illustration viewed from beneath.

FIGS. 10A to 10B illustrate an example of metal molds used for producing the female screw member shown in FIGS. 7C to 7E, wherein FIG. 10A is a sectional front view, and FIG. 10B is a cutaway perspective view.

DETAILED DESCRIPTION OF PREFERRED EMBODIMENTS

Figure 1A:
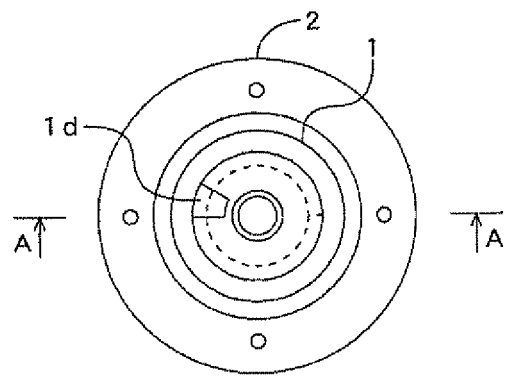

Then, the preferred embodiments of the present invention will be described with reference to the drawings.

FIGS. 1A to 1C to FIGS. 3A to 3B illustrate a female screw member according to the present invention. The female screw member (valve shaft holder) 1 has approximately similar configuration and function to the female screw member 61 illustrated in FIGS. 7A to 7E. The female screw member 1 includes a female screw part 1b provided with a female screw 1a, and a fully closing stopper part (fully closing fixing stopper for restricting the movement of valve body to a fully closing position of the valve) 1d projected on an upper face part of the female screw part 1b. The female screw member 1 further includes a cylindrical part 1c having a cylindrical space 1j with a larger diameter than a screw diameter of the female screw 1a coaxially formed with the female screw part 1b at one end of the female screw part 1b. The female screw member 1 yet further includes a fully opening stopper part (fully opening fixing stopper for restricting the movement of valve body to a fully opening position of the valve) 1f projected downward from a lower face of the female screw part 1b in the cylindrical space 1j. A joint ring 2 is integrally provided with a lower end part 1g via a projection 1h. In other words, the fully opening stopper part 1f is formed at a bottom part of the cylindrical part 1c.

Figure 7A:
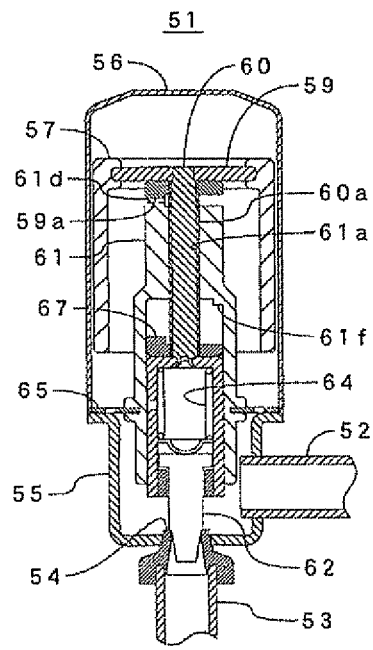
FIGS. 7A to 7E illustrate a motor operated valve according to the prior proposed invention by the applicant and a female screw member used for the motor operated valve, wherein FIGS. 7A and 7B each are cross-sectional views illustrating the motor operated valve when fully closing and when fully opening, respectively.
Figure 7B:
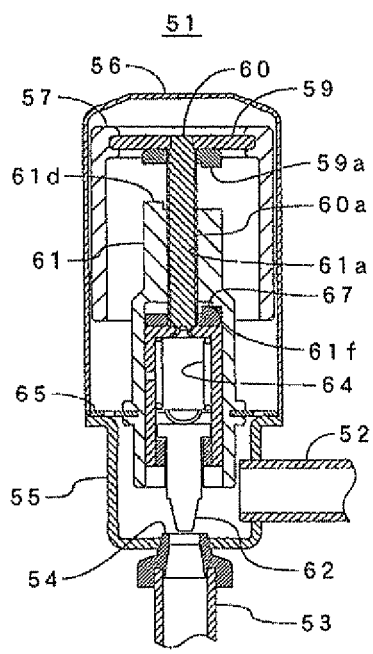
Figure 7C:
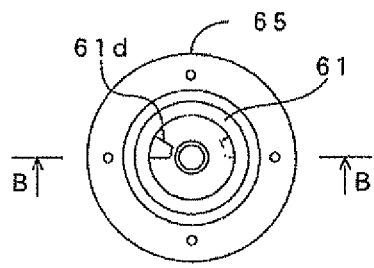
Figure 7D:
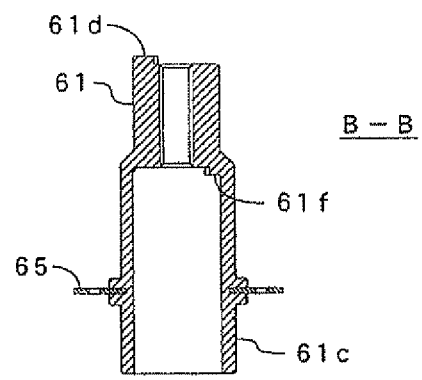
Figure 7E:
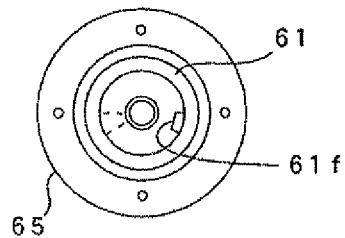
Figure 8C:
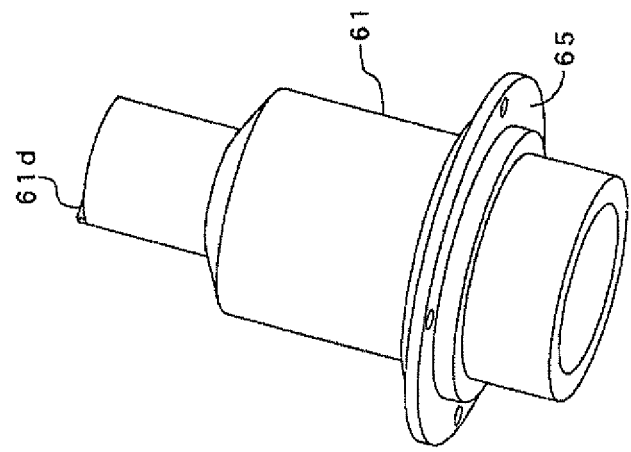
Figure 8B:
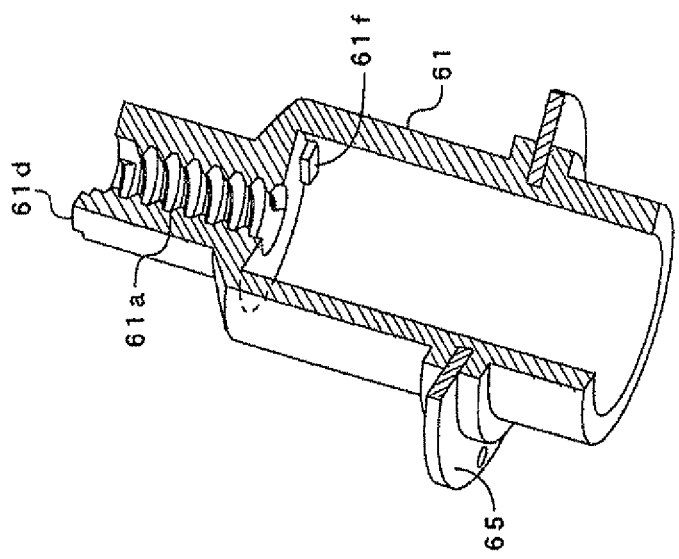
Figure 8A:
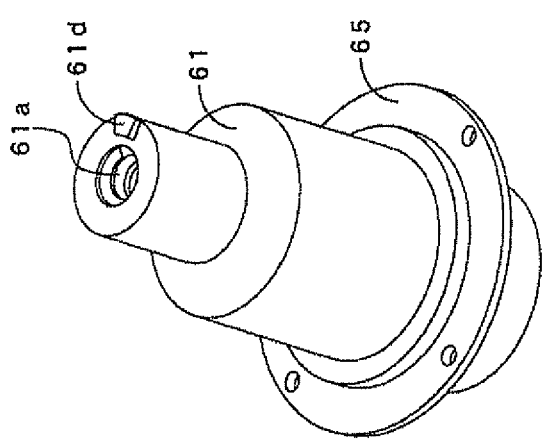
Figure 9:
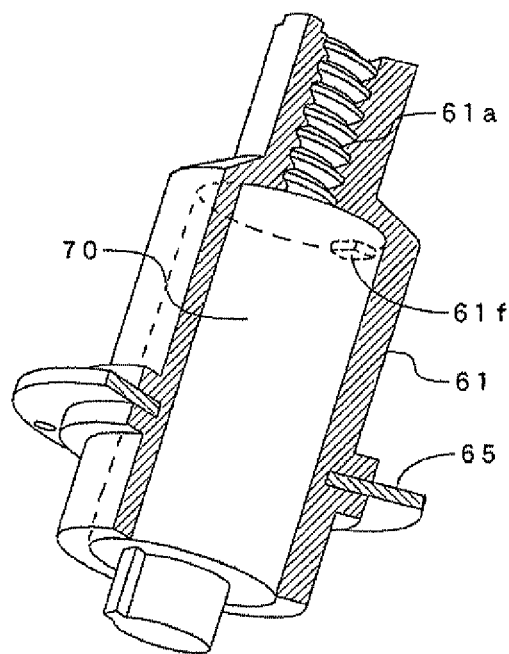
FIG. 9 is a partly sectional perspective illustration to explain that the female screw member in FIGS. 7C to 7E cannot be molded by one core.

The fully opening stopper part 1f includes a contact face (working face) 1k, which is formed in the rotating direction centering on a center shaft of the female screw 1a, and is in contact with the fully opening lower stopper part 67 illustrated in FIGS. 7A to 7B. The fully opening stopper part 1f further includes a spiral inclination face (a part of a ceiling face or bottom part of the cylindrical part 1c) 1e, which gradually approaches the female screw 1a side from a lower edge part of the contact face 1k as clearly illustrated in FIG. 3B. The fully opening stopper part 1f yet further includes a circumferential inner face 1m positioned on the axial line side of the female screw part 1a. The spiral inclination face 1e can be represented as a line in this embodiment if the spiral inclination face is developed centering on the center shaft of the female screw 1a. The spiral inclination face 1e is continuously formed, until going in the rotating direction of the female screw from the lower edge part of the contact face 1k and reaching again an upper end of the contact face 1k (a contacting face with the bottom part of the cylindrical part 1c) (more specifically, until going by one round). A height T of the contact face 1k (a length in the center shaft direction of the contact face 1k) is set to be equal to or smaller than a pitch P of the female screw 1a.

When the fully opening lower stopper part 67 is in contact with the fully opening stopper part 1f, a rotation of the rotor 57 is forcibly stopped.

The female screw member 1 is different from the female screw member 61 in the following respect. Since an inner wall surface of the female screw member 1 is molded with one core, the fully opening stopper part 1f includes the spiral inclination face 1e and the circumferential inner face 1m. In the other than this respect, the female screw member 1 has a similar configuration to the female screw member 61.

Figure 4A:
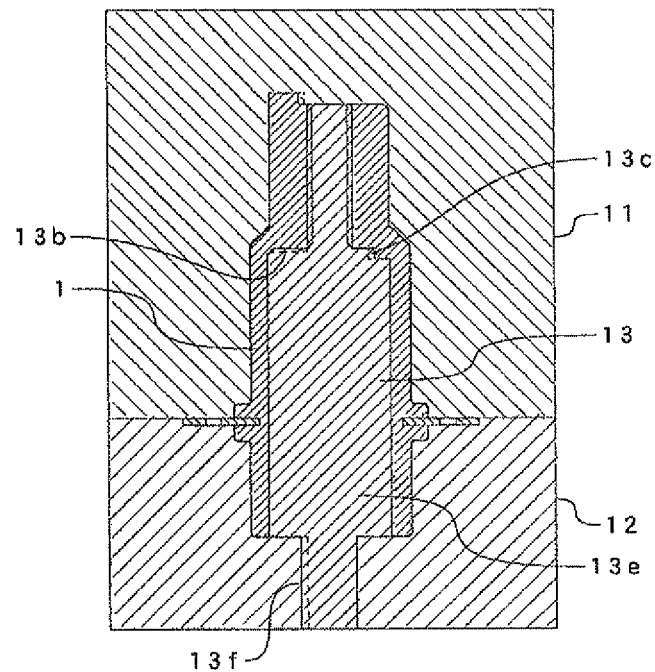
Figure 4B:
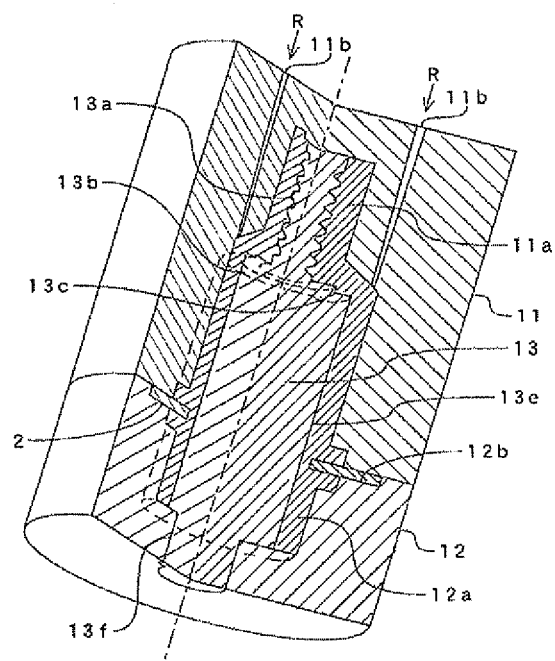
Figure 5:
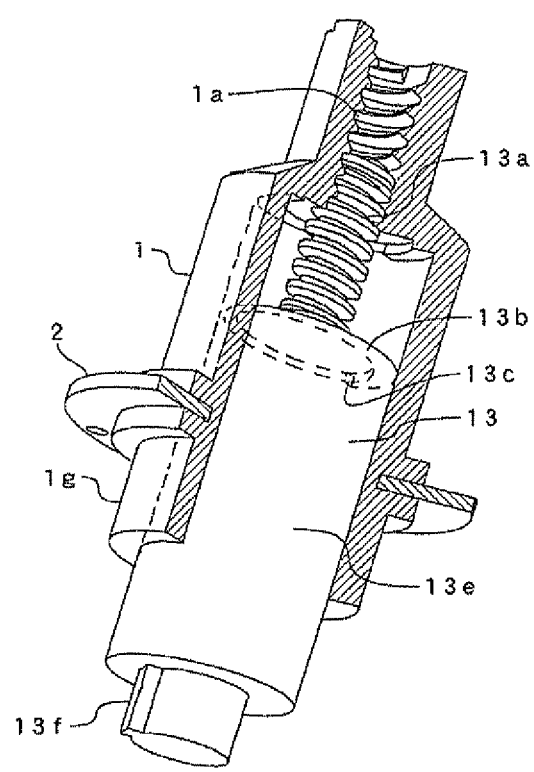
FIG. 5 is a partly sectional perspective view illustrating the female screw member shown in FIGS. 1A to 1C and a core of the metal mold shown in FIGS. 4A to 4C.

FIGS. 4A to 4B and FIG. 5 illustrate metal molds for molding the female screw member 1. FIG. 4B is a cut-away perspective view taken by cutting the core 13, molds 11 and 12 etc. along the centerline of the core 13 by a predetermined angle. In FIG. 4B, an area on the right side of the centerline and an area on the left side are illustrated with hatchings having different inclination angels even though these areas are within same parts, for easily understanding of the assembled state. Furthermore, FIG. 4B illustrates a state that a resin is injected into gaps 11a and 12a from an injection port 11b as described below.

The mold is configured with an upper mold 11, a lower mold 12, and one core 13.

The upper mold 11 includes a gap 11a for molding the female screw part 1b side of the female screw member 1 and an upper part of the cylindrical part 1c between the upper mold 11 and the core 13. The upper mold 11 further includes an injection port 11b of a resin R.

The lower mold 12 includes a gap 12a for molding the lower end part 1g side (a lower part of the cylindrical part 1c) of the female screw member 1 between the lower end 12 and the core 13. The lower mold 12 further includes a ring-like housing part 12b for insert-molding the joint ring 2 on an upper face.

The core 13 includes the following parts so that the inner wall surface of the female screw member 1 can be formed by one core 13. That is, the core 13 includes a male screw part 13a for molding the female screw 1a of the female screw member 1 at an upper part thereof, and a plane part 13c for molding the contact face 1k of the female screw member 1. The core 13 further includes a spiral part 13b for molding the spiral inclination face 1e, which inclines continuously from a top end of the contact face 1k and goes by one round, so that the fully opening stopper part 1f of the female screw member 1 does not come to be an undercut. The core 13 yet further includes a cylindrical part 13e for molding the cylindrical space 1j of the female screw member 1, and a projection 13f extended at a lower end part. The projection 13f is provided to rotate and pull out the core 13 after molding the female screw member 1.

Figure 10A:
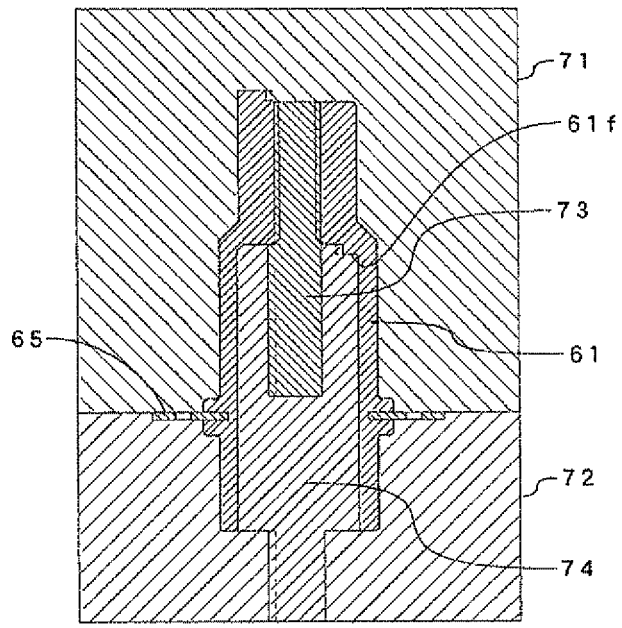
Figure 10B:
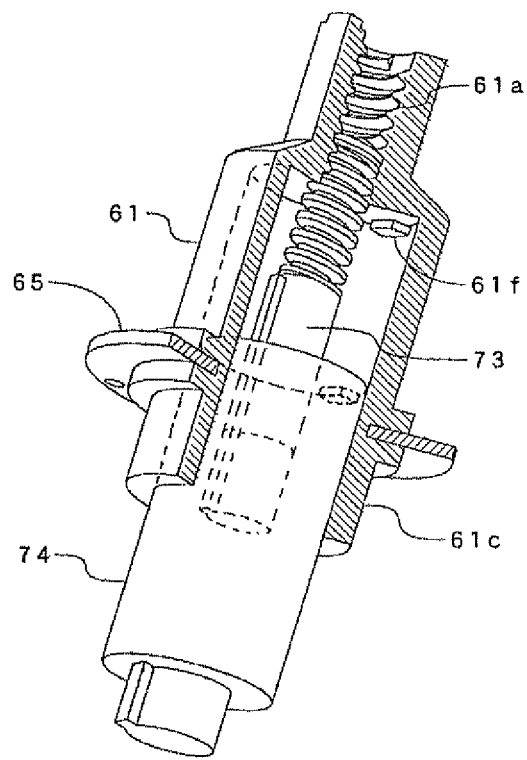

After the joint ring 2 is housed in the housing part 12b of the lower mold 12 by using the mold as illustrated in FIGS. 4A to 4B, the upper mold 11, the lower mold 12, and the core 13 are assembled, and the resin R is injected from the injection port 11b and is cured. Then, the lower mold 12 is removed at first, and then the core 13 is removed from the female screw member 1 by rotating using the projection 13f. As mentioned above, the height T of the contact face 1k is set to be equal or smaller than the pitch P. Thus, when the core 13 is pulled out, the spiral part 13b of the core 13 is moved smoothly along the spiral inclination face 1e of the female screw member 1, or is moved gradually separating from the spiral inclination face 1e according to the rotation of the core 13. Therefore, the fully opening stopper part 1f does not come to be an undercut, and the core 13 can be pulled out easily. More specifically, when a portion on the downstream side in the rotating direction of the core 13 is set to be, for example, a vertical face (a face vertical to the rotating direction) in the fully opening stopper part 1f as illustrated in FIGS. 10A to 10B, the fully opening stopper part 1f comes to be an undercut as mentioned above. However, the portion on the downstream side in the rotating direction of the core 13 in the fully opening stopper part 1f is formed spirally in the same way of the movement when taking out the core 13 (the movement of rotating and moving in the axial direction of the female screw). Thus, the undercut is not generated. In addition, the upper mold 11 can be removed anytime after the resin is cured.

Figure 1B:
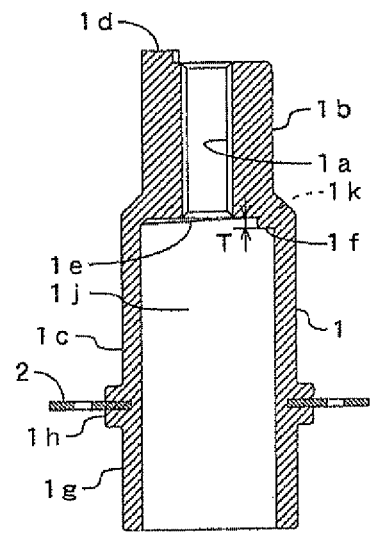
Figure 1C:
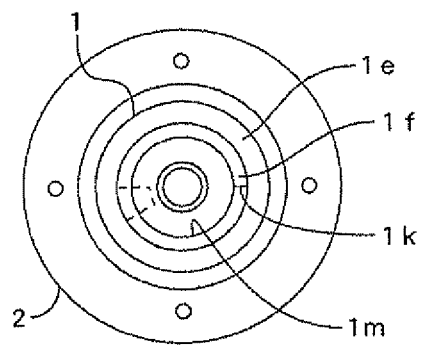
Figure 2A:
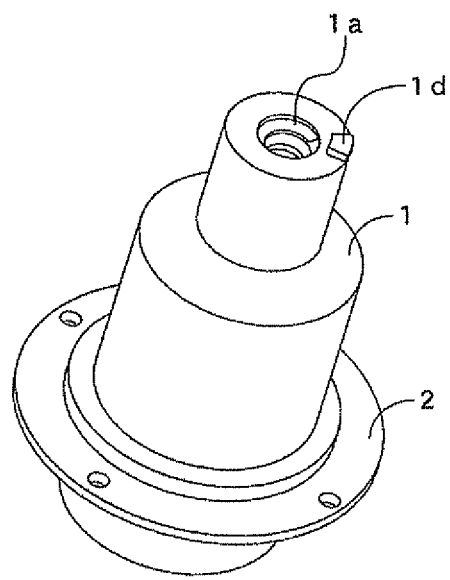
Figure 2B:
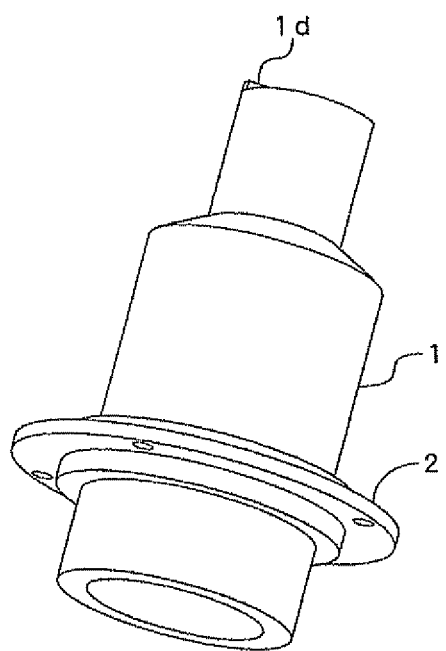
Figure 3A:
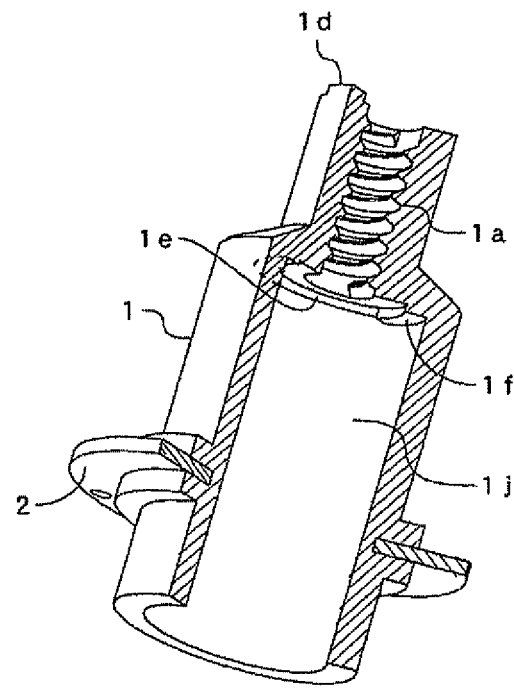
Figure 3B:
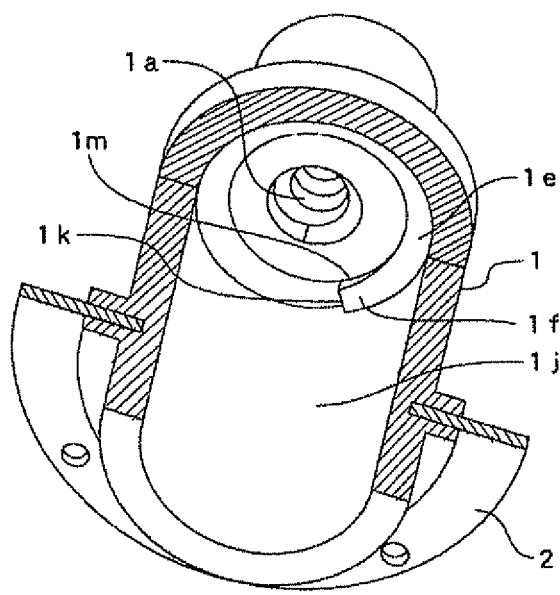

In the female screw member 1 produced by the aforementioned method, the fully opening stopper 1f has the contact face 1k and the spiral inclination face 1e as illustrated in FIGS. 1A to 1C. When the fully opening lower stopper part 67 illustrated in FIGS. 7A to 7B is in contact with the fully opening stopper part 1f, the rotation of the rotor 57 is forcibly stopped, and the motor operated valve 51 comes to be in a fully opening state.

Meanwhile, in the above description, the spiral inclination face 1e is formed so that it goes around the center shaft of the female screw by one round from the lower edge part (top end) of the contact face 1k and reaches again the upper end (end part on the opposite side to the top end) of the contact face. However, the present invention is not limited to this shape of the spiral inclination face 1e. As described below regarding FIGS. 6A to 6C, a flat part (a plane face vertical to the center shaft of the female screw) can be formed at a top end and/or a rear end of the spiral inclination face 1e.

Figure 6A:
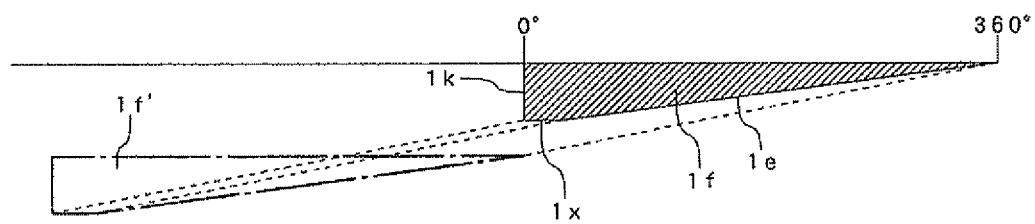
Figure 6B:
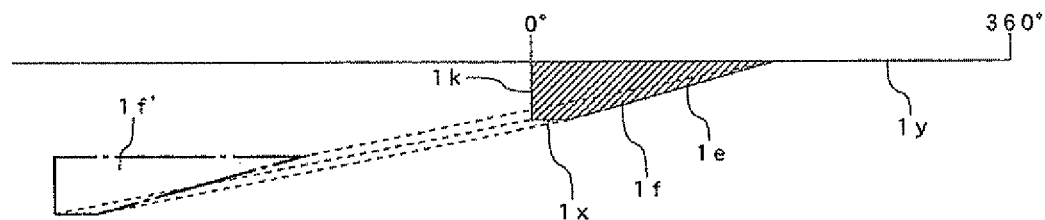
Figure 6C:
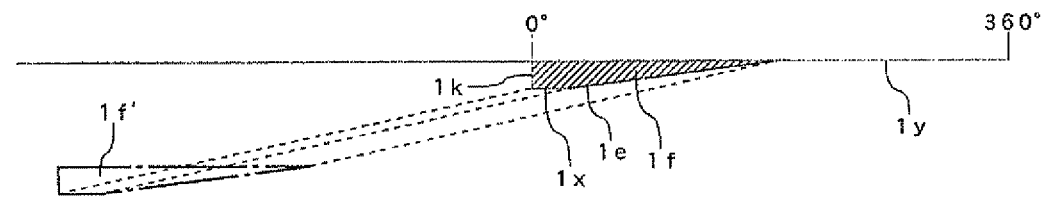

FIGS. 6A to 6C are explanatory diagrams illustrating a modified example of the spiral inclination face 1e, explaining a state that the spiral inclination face 1e is pulled out by using a development elevation of the spiral inclination face 1e centering on the center shaft of the female screw 1a. (In FIGS. 6A to 6C, a horizontal axis indicates a rotation angle of the female screw 1a, and a vertical axis indicates the direction of the center shaft of the female screw 1a. An inclination angle of the inclination face 1e is illustrated with a little exaggeration.)

FIG. 6A illustrates a modified example of the present invention. A flat part 1x is provided at the top end of the spiral inclination face 1e (a contact part with the top end of the contact face 1k). In this case, as illustrated in FIG. 6A, when it is assumed that the female screw member 1 rotates according to a thread of the female screw 1a (a fully opening stopper before rotation is illustrated with a numerical symbol 1f and a fully opening stopper after rotation is illustrated with a numerical symbol 1f'), the inclination angle of the spiral inclination face 1e, the height of the contact face 1k, the distance of the flat part 1x, and the like can be suitably set so that the rotating spiral inclination face 1e does not interfere with a spiral inclination face which is not rotating. In other word, if the core 13 is configured so as to obtain the inclination angle of the spiral inclination face 1e, the height of the contact face 1k, the distance of the flat part 1x, and the like which are set as mentioned above, the core 13 can be taken out without interfering of the spiral part 13b of the core 13 with the spiral inclination face 1e of the female screw member when taking out the core 13.

FIG. 6C illustrates another modified example of the present invention. The flat part 1x is provided at the top end of the spiral inclination face 1e (the contact part with the top end of the contact face 1k). In addition, a flat part 1y is provided at a rear end of the spiral inclination face 1e (a contact with the lower end of the contact face 1k). In this example, when it is assumed that the female screw member 1 rotates according to the thread of the female screw 1a, the fully opening stopper part 1f is formed so that the rotating spiral inclination face 1e does not interfere with a spiral inclination face which is not rotating. Accordingly, the core 13 can be pulled out.

FIG. 6B illustrates an example in which the flat parts 1x and 1y are provided at the top and rear ends of the spiral inclination face 1e as shown in FIG. 6C. In this example, when it assumed that the female screw member 1 rotates according to the thread of the female screw 1a, the rotating spiral inclination face 1e interferes with a spiral inclination face which is not rotating. In this example, the core 13 interferes with the spiral inclination face 1e when pulling out the core 13, so that the core 13 cannot be pulling out.

Furthermore, the present invention is not limited to the aforementioned example in which the flat parts 1x and 1y are formed at the top end and/or the rear end of the spiral inclination face 1e. The flat part can be formed at a middle part of the spiral inclination face 1e. Further, the spiral inclination face 1e can have a plurality of inclination angles, or the development elevation can be formed so as not to be linear like the above examples but to be curved.

In any example, when it is assumed that the female screw member 1 rotates in line with the thread of the female screw 1a, the inclination angle of the spiral inclination face 1e, the height of the contact face 1k, and the like can be suitably set so that the rotating spiral inclination face 1e does not interfere with a spiral inclination face which is not rotating. Accordingly, the core 13 can be pulled out. When the spiral inclination face 1e has a plurality of inclination angles or a continuous inclination angle, the core 13 can be pulled out by an angle equal to or larger than the maximum inclination angle.

Furthermore, the present invention is not applied to only the female screw member of the motor operated valve. If a female screw member includes a projection projecting in the direction of a center shaft of a female screw and having a working face in the rotating direction centering on the center shaft of the female screw, the present invention can be applied to any parts and products. In other words, the female screw member of the present invention is not limited to the screw member illustrated in FIGS. 1A to 10, and the female screw member can be a female screw member not having the cylindrical part 1c configuring the cylindrical space 1j.

What is claimed is:

1. A female screw member comprising:
   a female screw part formed with a female screw; and
   a projection part projecting in the direction of a center shaft of the female screw and having a working face in the rotating direction centering on the center shaft, said female screw part and projection part being integrally molded with a resin and formed by using only one core,
   wherein the projection part has a spiral inclination face spirally inclining by one round from the working face centering on the center shaft of the female screw, and
   wherein the height of the working face is equal to or smaller than a pitch of the female screw.

2. The female screw member according to claim 1, wherein the female screw part includes a cylindrical part having a larger inner diameter than the female screw, and wherein the projection part is formed at a bottom of the cylindrical part.

3. The female screw member according to claim 2, wherein the projection part is a fully opening fixing stopper in contact with a fully opening movable stopper provided at a valve shaft of a motor operated valve threadedly connected to the female screw.

4. A motor operated valve comprising:
   a valve main body having a valve seat;
   the female screw member according to claim 3 attached to the valve main body;
   an electric motor having a rotor and a stator; and
   a valve shaft being threadedly connected to a female screw of the female screw member, being rotated and driven by the rotor, and having a fully opening movable stopper capable of contacting to the fully opening fixing stopper.

5. The female screw member according to claim 3, wherein a fully closing fixing stopper is further formed at an end part on the opposite side to the cylindrical part in the female screw part.

6. A motor operated valve comprising:
   a valve main body having a valve seat;
   the female screw member according to claim 5 attached to the valve main body;
   an electric motor having a rotor and a stator; and
   a valve shaft being threadedly connected to a female screw of the female screw member, being rotated and driven by the rotor, having a fully opening movable stopper capable of contacting to the fully opening fixing stopper, and a fully closing movable stopper capable of contacting to the fully closing fixing stopper.

7. A female screw member comprising:
   a female screw part formed with a female screw; and
   a projection part projecting in the direction of a center shaft of the female screw and having a working face in the rotating direction centering on the center shaft, said female screw part and projection part being integrally molded with a resin and formed by using only one core, wherein the projection part has a spiral inclination face spirally inclining from the working face centering on the center shaft of the female screw, and wherein the spiral inclination face is formed so that the female screw member is not interfered with the spiral inclination face when rotating in line with a thread of the female screw.

8. The female screw member according to claim 7, wherein the spiral inclination face includes a linear portion in development elevation at least a part of the spiral inclination face.

9. The female screw member according to claim 7, wherein the spiral inclination face comprises at least one plane part perpendicular to the center shaft while rotating by one round from the working face and reaching again to the working face.

10. The female screw member according to claim 9, wherein the spiral inclination face includes a linear portion in development elevation at least a part of the spiral inclination face.

11. The female screw member according to claim 7, wherein the female screw part includes a cylindrical part having a larger inner diameter than the female screw, and wherein the projection part is formed at a bottom of the cylindrical part.

12. The female screw member according to claim 11, wherein the projection part is a fully opening fixing stopper in contact with a fully opening movable stopper provided at a valve shaft of a motor operated valve threadedly connected to the female screw.

13. A motor operated valve comprising:
a valve main body having a valve seat;
the female screw member according to claim 12 attached to the valve main body;
an electric motor having a rotor and a stator; and
a valve shaft being threadedly connected to a female screw of the female screw member, being rotated and driven by the rotor, and having a fully opening movable stopper capable of contacting to the fully opening fixing stopper.

14. The female screw member according to claim 12, wherein a fully closing fixing stopper is further formed at an end part on the opposite side to the cylindrical part in the female screw part.

15. A motor operated valve comprising:
a valve main body having a valve seat;
the female screw member according to claim 14 attached to the valve main body;
an electric motor having a rotor and a stator; and
a valve shaft being threadedly connected to a female screw of the female screw member, being rotated and driven by the rotor, having a fully opening movable stopper capable of contacting to the fully opening fixing stopper, and a fully closing movable stopper capable of contacting to the fully closing fixing stopper.

* * * * *